US009529206B2

(12) United States Patent
Xing et al.

(10) Patent No.: US 9,529,206 B2
(45) Date of Patent: Dec. 27, 2016

(54) BACKLIGHT CONTROL METHOD, APPARATUS AND 3D DISPLAY SYSTEM

(71) Applicant: Shanghai AVIC Optoelectronics Co., Ltd., Shanghai (CN)

(72) Inventors: Liang Xing, Shanghai (CN); Wei Xu, Shanghai (CN); Lihua Xu, Shanghai (CN)

(73) Assignee: SHANGHAI AVIC OPTOELECTRONICS CO., LTD., Shanghai (CN)

( * ) Notice: Subject to any disclaimer, the term of this patent is extended or adjusted under 35 U.S.C. 154(b) by 141 days.

(21) Appl. No.: 13/942,627

(22) Filed: Jul. 15, 2013

(65) Prior Publication Data
US 2013/0308068 A1    Nov. 21, 2013

Related U.S. Application Data

(63) Continuation of application No. PCT/CN2012/074995, filed on May 2, 2012.

(30) Foreign Application Priority Data

May 4, 2011    (CN) .......................... 2011 1 0113997

(51) Int. Cl.
*G02F 1/1335*    (2006.01)
*G02B 27/22*    (2006.01)
(Continued)

(52) U.S. Cl.
CPC .......... *G02B 27/2228* (2013.01); *G09G 3/003* (2013.01); *G09G 3/342* (2013.01);
(Continued)

(58) Field of Classification Search
CPC ... G02B 27/22; G02B 27/2228; G02F 1/1336; G02F 1/133602; G02F 1/0105; G09G 3/342–3/3426; G09G 2310/0237; G09G 2310/024; G09G 2320/0209; G09G 2330/021; H04N 13/0438
See application file for complete search history.

(56) References Cited

U.S. PATENT DOCUMENTS 6,940,646 B2 *   9/2005   Taniguchi .......... G02B 27/2214
                                                    348/54
8,704,883 B2 *   4/2014   Lee ...................... G02B 27/225
                                                    348/42
(Continued)

FOREIGN PATENT DOCUMENTS

CN    101650922 A    2/2010
CN    101697595 A    4/2010
(Continued)

OTHER PUBLICATIONS

International Search Report as received in international application PCT/CN2012/074995, dated Aug. 2, 2012.
(Continued)

*Primary Examiner* — Paisley L Arendt
(74) *Attorney, Agent, or Firm* — Alston & Bird LLP

(57) ABSTRACT

A method includes dividing a backlight source and a liquid crystal panel into N row sections, preprocessing 3D images to output first images and second images of left and right eyes in a complementary format, while preserving odd and even row section images of original images of the left and right eyes, and sequentially scanning the first images and second images of the left and right eyes from top to bottom using the backlight source. The method further includes, after scanning a row section, controlling the backlight of the row section to be turned on and then turned off until the same row section of a next image starts to be scanned, and repeating until all images are scanned. The method thus provides a crosstalk-free 3D effect and reduces power consumption of the backlight source.

19 Claims, 10 Drawing Sheets

(51) Int. Cl.
  *G09G 3/00* (2006.01)
  *G09G 3/34* (2006.01)

(52) U.S. Cl.
  CPC . *G02F 1/133602* (2013.01); *G09G 2310/024* (2013.01); *G09G 2310/0224* (2013.01); *G09G 2310/0237* (2013.01); *G09G 2320/0209* (2013.01); *G09G 2330/021* (2013.01)

(56) References Cited

U.S. PATENT DOCUMENTS

2008/0036853 A1 2/2008 Shestak et al.
2010/0066820 A1* 3/2010 Park et al. ............... 348/53

FOREIGN PATENT DOCUMENTS

| CN | 101848398 A | 9/2010 |
| JP | 2010-78985 A | 4/2010 |
| JP | 2010078985 A * | 4/2010 |
| KR | 10-2010-0022653 A | 3/2010 |
| KR | 10-2010-0088075 A | 8/2010 |
| WO | WO2010032927 A2 | 3/2010 |
| WO | 2011029293 A1 | 3/2011 |

OTHER PUBLICATIONS

Extended Search Report as received from the European Patent Office in corresponding Application No. 12779578.9, dated Feb. 18, 2015.

* cited by examiner

--Prior Art--

--Prior Art--

BACKLIGHT CONTROL METHOD, APPARATUS AND 3D DISPLAY SYSTEM

CROSS-REFERENCES TO RELATED APPLICATIONS

This application claims priority to and is a continuation of International Application No. PCT/CN2012/074995, filed on May 2, 2012, entitled "BACKLIGHT CONTROL METHOD AND DEVICE, AND 3D DISPLAY SYSTEM", which claims priority to Chinese Patent Application No. 201110113997.8, filed with the Chinese Patent Office on May 4, 2011 and entitled "BACKLIGHT CONTROL METHOD, APPARATUS AND 3D DISPLAY SYSTEM", the contents of which are incorporated herein by reference in their entirety.

FIELD OF THE INVENTION

The present invention relates to 3D display technologies and, more particularly, to a backlight control method, apparatus and a 3D display system based on such apparatus.

BACKGROUND OF THE INVENTION

Along with the continuous development of modern sciences and technologies, 3D (three dimensional) display technologies also develop rapidly. 3D display technologies make use of the principle of human binocular parallax, in which the left and right eyes of a person receive different images taken from two different angles, and the brain superposes the images and regenerates image information which is perceived with a stereoscopic effect of front-back, up-down, left-right, far-near, etc. As a result, a viewer may watch a film or a video with highly realistic effect. In order to achieve such a stereoscopic effect on a flat display, the images of the left and right eyes (interchangeably referred as "left-eye image", "right-eye image" hereinafter) have to be separated. At present, the 3D display technologies are used in cooperation with 3D glasses. Particularly, there are solutions that use color separation, light separation and time division methods to be used in cooperation with the 3D glasses.

Recently, time division method is most widely used, and it generally relates to an active shutter-based 3D display approach in which images of left and right eyes are alternately displayed in a temporal sequence and also an infrared synchronization signal transmitter and shutter glasses cooperate therewith to present a stereoscopic image. The structure of a system using the active shutter-based 3D display approach is illustrated in FIG. 1, and generally includes a display device, a computer, an infrared transmitter and shutter glasses. In this approach, the display device displays 3D data at a frame frequency of 120 Hz. Particularly 60 frames of images of the left eye and 60 frames of images of the right eye are alternately displayed in a temporal sequence, and since each frame includes data refresh time and data hold time (T in FIG. 2 represents the time of one frame of image). During the Vertical Blanking Interval (VBI) time in FIG. 2, the left eyeglass L of the shutter glasses is opened (the opened status represents a status at which light can be transmitted) when refreshing of the left eye (L1, L2, etc., in FIG. 2) is finished. As shown, the data hold time (VBI) arrives after each image frame of the left eye has been scanned. Similarly, the right eyeglass R of the shutter glasses is opened when the data hold time (VBI) arrives after each frame of image of the right eye (R1, R2, etc., in FIG. 2) has been scanned As illustrated in FIG. 2, response time Ton of liquid crystals when the eyeglass is opened and response time Toff of the liquid crystals when the eyeglass is closed are included. The shutter glasses are synchronized with the display device in timing sequence through the infrared transmitter in cooperation with an infrared receiver integrated on the shutter glasses. This approach can separate the images of the left eye to achieve the 3D effect.

However, since the eyeglasses of the shutter glasses typically include a liquid crystal display, and the response time of liquid crystals is on the order of ms, a minimum period of time for the eyeglasses to be open or closed completely is required. In addition, the shutter glasses are open only in the VBI time and thus there is a greatly shortened time for response remaining for the liquid crystals. Accordingly, there is a loss of brightness because the opening of the eyeglasses is delayed due to the response time required for the liquid crystals. In addition, there is a delay in closing the eyeglasses due to the response time required for the liquid crystals, so that the images of the left and right eyes may be visible at the same time to an observer, thus resulting in a problem of considerable crosstalk between the images of the left and right eyes, tending to cause a residual image and lowering the effect of a dynamic image.

Furthermore, the following drawbacks may result from the shutter glasses using liquid crystal. The cumbersome glasses may make a user uncomfortable after wearing the glasses for a long period of time and may be further inconvenient particularly to those with nearsighted glasses. In addition, the glasses are electronic devices with rechargeable lithium battery and therefore release electromagnetic radiation. Furthermore, the battery is at a risk of explosion. The glasses are signal-synchronized through the infrared receiver with the infrared transmitter connected to the computer, and an infrared signal may be interrupted if the propagation path of the signal is hindered, thus degrading the display effect. The glasses are costly, have a short service period, are easily damaged and have high usage cost. A 3D display system in the prior art for which the shutter glasses are required is costly due to the foregoing drawbacks of the glasses.

BRIEF SUMMARY OF THE INVENTION

In view of this, the invention provides a backlight control method and apparatus and a 3D display system so as to overcome the problems in the prior art of crosstalk between images of left and right eyes, a residual image, reduced power consumption of the system and an decreased cost of the system, all of which may occur because shutter glasses cannot be opened and closed rapidly due to a response time required for liquid crystals to respond.

Embodiments of the present invention provide a method for controlling a backlight source for a liquid crystal panel, the backlight source and the liquid crystal panel having a same number of row sections. The method includes obtaining and preprocessing 3D image frames, each of the 3D image frames having a left-eye image and a right-eye image, to output, in a complementary format, a first left-eye image, a second left-eye image, a first right-eye image, and a second right-eye image while preserving odd and even row sections of original left-eye and right-eye images, and scanning sequentially the first and second left-eye images and the first and second right-eye images using the backlight source. The method further includes, after scanning a row section of an image frame, controlling an initialized backlight of the row section to be turned on and then turned off until the same row section of a next image frame starts to be scanned, and repeating the scanning until all images are scanned.

In an embodiment, controlling the initialized backlight includes turning on the initialized backlight of the row section without a time delay, or turning on initialized backlight of the row section with a delay time t. The delay time t satisfies the expression t≤(N−1)/N*T, wherein T represents a time period of one frame, and N represents the number of horizontal row sections into which the backlight source and the liquid crystal panel are divided.

In an embodiment, sequentially scanning the first and second left-eye images and the first and second right-eye images includes determining that the images are obtained in an order of firstly the left-eye image and then the right-eye image or firstly the right-eye image and then the left-eye image, the left-eye image including the first left eye image preserving the odd row section image and the second left-eye image preserving complementarily the even row section image; and the images of the right eye including the first right-eye image and the second right-eye image preserving the odd and even row section images, and scanning each image frame sequentially from the top to the bottom until all the images are scanned.

In an embodiment, the method further includes scanning the images in cooperation with an active polarization light valve, controlling the active polarization light valve to be open when the scanning image is the left-eye image, and controlling the active polarization light valve to be closed when the scanning image is the right-eye image, or controlling the active polarization light valve to be opened when the scanning image is the right-eye image, and controlling the active polarization light valve to be closed when the scanning image is the left-eye image.

Embodiments of the present invention also provide a backlight control apparatus including an obtaining unit configured to obtain preprocessed 3D images, each of the preprocessed 3D images including a first left-eye image, a second left-eye image, a first right-eye image and a second right-eye image preserving odd and even row sections of original left-eye images and right-eye images. The backlight control apparatus also includes a scanning control unit configured to scan sequentially the first and second left-eye images and right-eye images according to a backlight source and a liquid crystal panel having pre-divided horizontal row sections. The scanned images are sequentially output in a top-down manner of the row sections, and after a row section of one frame of image is scanned, a backlight control unit configured to control an initialized backlight of the row section to be turned on and then turned off until a same row section of a next frame of image starts to be scanned, and to repeat this process until all the images are scanned.

In an embodiment, the backlight control apparatus further includes a preprocessing unit coupled to the obtaining unit and configured to preprocess 3D images to output, in the complementary format, the first left-eye image, the second left-eye image, the first right-eye image and the second right-eye image preserving the odd and even row sections of the original left-eye and right-eye images. Each of the 3D images is one frame of image, and a pre-dividing unit configured to divide the backlight source and the liquid crystal panel in a display device into N horizontal row sections, respectively, wherein N represents a number greater than or equal to 3.

Embodiments of the present invention also provide a 3D display system including a scanning control unit, a display device having a backlight, a backlight control unit, and 3D glasses. The 3D display system also includes an obtaining unit configured to obtain preprocessed 3D images, each of the preprocessed 3D images including a first left-eye image, a second left-eye image, a first right-eye image and a second right-eye image preserving odd and even row sections of original left-eye images and right-eye images. The 3D display system further includes a scanning control unit configured to scan sequentially the first and second left-eye images and right-eye images according to a backlight source and a liquid crystal panel having pre-divided horizontal row sections. The scanned images are sequentially output in a top-down manner of the row sections, and after a row section of one frame of image is scanned, a backlight control unit is configured to control an initialized backlight of the row section to be turned on and then turned off until a same row section of a next frame of image starts to be scanned, and to repeat the turning on and off the initialized backlight until all the images are scanned.

As it is apparent from the foregoing technical solutions, the invention provides advantageously a backlight control method and apparatus and a 3D display system, where a backlight source and a liquid crystal panel are configured with row sections, and in a process of scanning the liquid crystal panel, dynamic control is performed on the row sections of the backlight source in cooperation with image processing and display to thereby achieve a crosstalk-free 3D effect while lowering the power consumption of the system, and dynamic control is performed on the row sections of the backlight source to thereby lower a response speed of liquid crystals as required for shutter glasses, and shutter glasses with liquid crystals in a TN pattern can be adopted to thereby lower usage cost of both the shutter glasses and the system.

Furthermore, the backlight control method and apparatus according to the embodiments of the invention can also be applicable in compatibility with both shutter glasses and an active polarization 3D system, thereby extending a wide applicability scope of the invention.

BRIEF DESCRIPTION OF THE DRAWINGS

The drawings described herein are merely illustrative of certain embodiments of the invention, and those of ordinarily skill in the art can further derive other embodiments from the provided drawings without inventive effort.

DETAILED DESCRIPTION OF THE INVENTION

For the sake of reference and clarity, definitions or abbreviations of technical terms used hereinafter are provided below:

3D: Three-Dimensional;
TFT: Thin Film Transistor;
TN pattern: Twisted Nematic pattern;
VBI: Vertical Blanking Interval; and
LED: Light Emitting Diode.

The technical solutions in the embodiments of the present invention are described below with reference to the drawings. The embodiments described herein are not exhaustive. Accordingly, not all embodiments of the invention are presented. Based on the presented embodiments of the invention, other embodiments obtained by those ordinarily skilled in the art are included in the scope of the invention.

Embodiments of the present invention disclose a method and apparatus for controlling a backlight source in a liquid crystal display device and a 3D display system incorporating the backlight control method and apparatus. In an embodiment, a liquid crystal display device includes a display panel which is illuminated by an associated backlight source. The liquid crystal panel and the backlight source each are divided into a plurality of row sections, and a dynamic control is performed on the row sections of the backlight source in cooperation with image processing and display to thereby achieve a crosstalk-free 3D display while lowering the power consumption of the system. In an embodiment, the row sections of the backlight source are dynamically controlled so that lower response speed of the liquid crystals as required by shutter glasses can be achieved, and shutter glasses with liquid crystals in a TN pattern can be used to enable a lower usage cost of both the shutter glasses and the system. Furthermore, the backlight control method and apparatus according to embodiments of the invention can also be used with both shutter glasses and an active polarization 3D system.

First Embodiment

Figure 1:
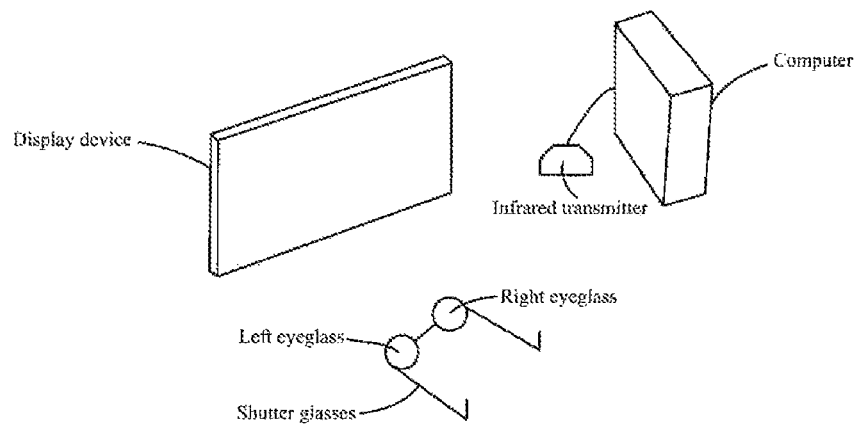
FIG. 1 is a schematic structural diagram of an active shutter-based 3D display system in the prior art.
Figure 2:
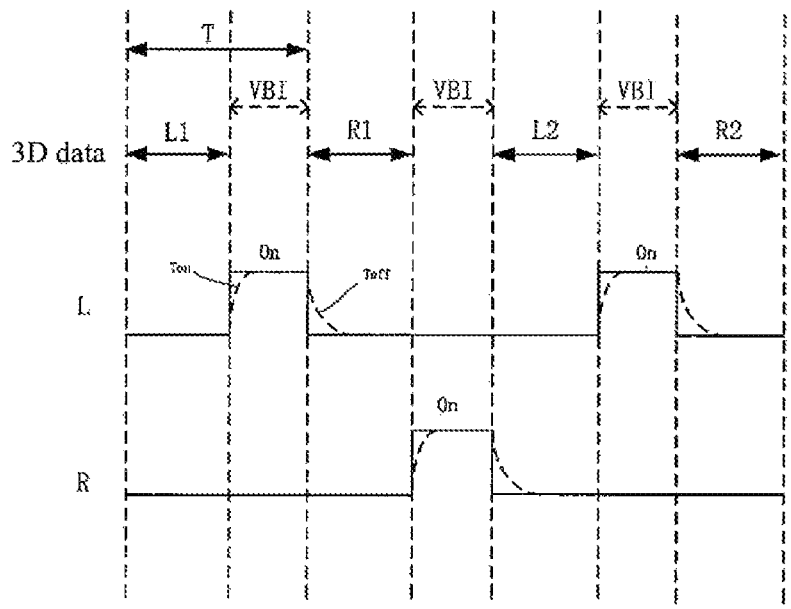
FIG. 2 is a schematic diagram of an operation principle of the active shutter-based 3D display system in the prior art.
Figure 3:
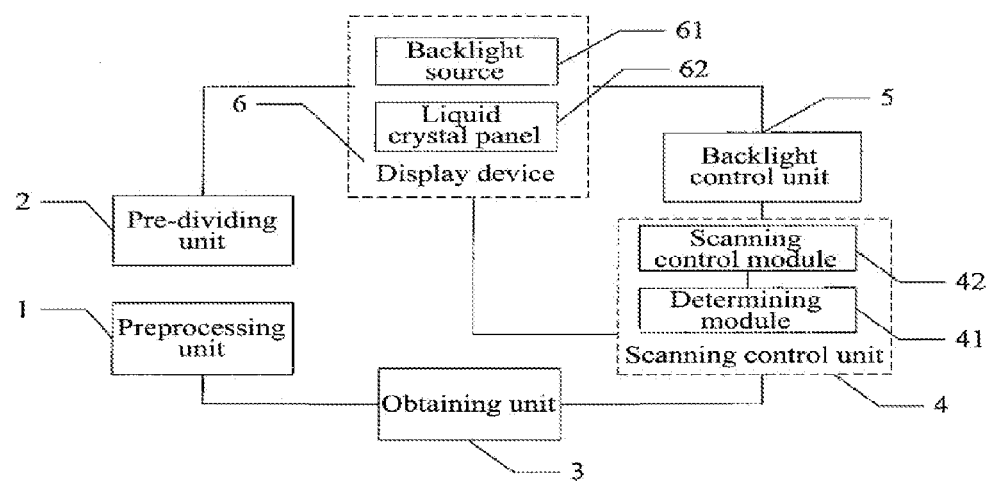
FIG. 3 is a schematic structural diagram of a backlight control apparatus according to an embodiment of the invention.

FIG. 3 is a simplified block diagram of a backlight control apparatus for a display device 6 according to an embodiment of the invention. The apparatus is shown as including a preprocessing unit 1, a pre-dividing unit 2, an obtaining unit 3, a scanning control unit 4 and a backlight control unit 5. Display device 6 is shown as including a backlight source 61 and a liquid crystal panel 62. In an embodiment, liquid crystal panel 62 has an image display region that is divided into a number of horizontal row sections, and backlight source 61 is divided into the same number of horizontal row sections.

The preprocessing unit 1 is configured to preprocess obtained 3D image frames to output, in a complementary format, a first left-eye image (interchangeably referred to as "first image of a left eye" hereinafter), a second left-eye image (interchangeably referred to as "second image of a left eye" hereinafter), a first right-eye image (interchangeably referred to as "first image of a right eye" hereinafter), and a second right-eye image (interchangeably referred to as "second image of a right eye" hereinafter), while preserving odd and even row sections of original left-eye and right-eye images. Each image frame has a left-eye image and a right-eye image.

The pre-dividing unit 2 is coupled to the display device 6 and configured to divide backlight source 61 and crystal liquid panel 62 into N horizontal row sections. In other words, backlight source 61 may include N backlight row sections each associated with one of the N row sections of the liquid crystal panel 62.

Figure 4:
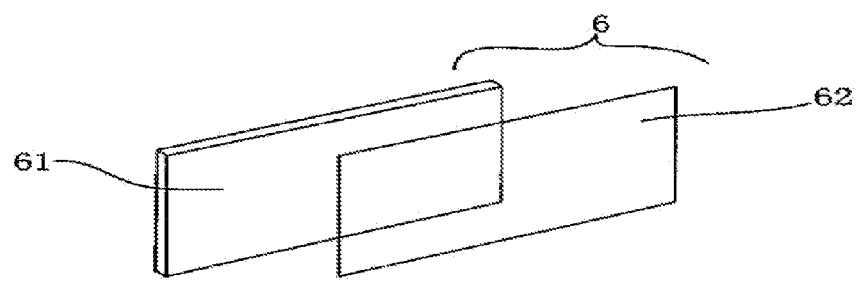
FIG. 4 is a schematic structural diagram of a display device according to an embodiment of the invention.
Figure 5:
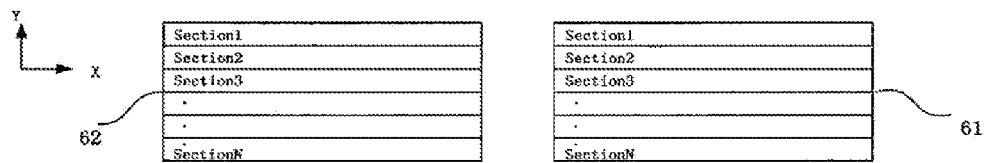
FIG. 5 is a schematic structural diagram of row sections of a backlight source and a liquid crystal panel according to an embodiment of the invention.

The display device 6 as illustrated in FIG. 4 includes the backlight source 61 and the crystal liquid panel 62. As illustrated in FIG. 5, the backlight source 61 and the crystal liquid panel 62 each are divided into N horizontal row sections, where N represents a number greater than or equal to 3, (N≥3). The width of each row section of the crystal liquid panel 62 (in the Y direction) can be consistent with that of a pixel in the X row, and the number of pixels located in the X row is greater than or equal to 1.

It shall be noted that the crystal liquid panel 62 may not be really divided in physical sense into N row sections, that is, the crystal liquid panel 62 is not physically modified. In a backlight control process according to an embodiment of the invention, TFTs of the liquid crystal panel are controlled in a row scanning pattern to be turned on and off to refresh the display. Thus, the crystal liquid panel 62 can be controlled per a row section without any modification to its physical architecture.

The backlight source 61 can be divided into N row sections in combination with the structural design of the backlight source to thereby control the backlight of each of the N row sections to be turned on and off separately.

In an embodiment of the invention, the structure of the backlight source 61 can be any structure which enables the backlight source to be controlled by a row section, and such structures may include, but will not be limited to, a straight-down backlight source and a side-light backlight source, and the type of light source on the backlight source 61 in an embodiment of the invention may include but will not be limited to a Light Emitting Diode (LED), a Cold Cathode Fluorescent Lamp (CCFL), a Hot Cathode Fluorescent Lamp (HCFL), an External Electrode Fluorescent Lamp (EEFL) and an Organic Light Emitting Diode (OLED), etc.

Figure 6:
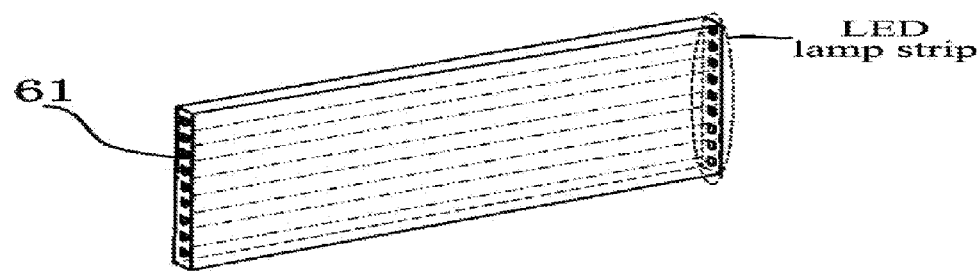
FIG. 6 is a schematic structural diagram of a backlight source with a light source type being an LED according to an embodiment of the invention.
Figure 7:
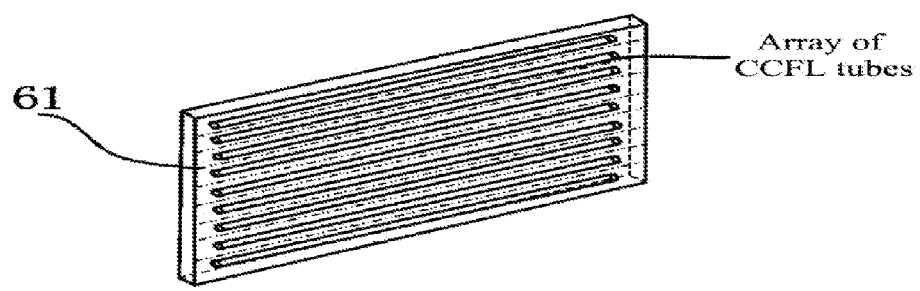
FIG. 7 is a schematic structural diagram of a backlight source with a light source type being an array of CCFL tubes according to an embodiment of the invention.

FIG. 6 and FIG. 7 illustrate two feasible structures of the backlight source, where in the structure illustrated in FIG. 6, two LED lamp strips or one LED lamp strip (there is a higher requirement on light guidance plates in the case of one LED lamp strip) with incident light being Y side-directed are used, and the backlight is controlled dynamically per row section in cooperation with an arranged network of light guidance plates, that is, the backlight corresponding to each row section is controlled separately to be turned on and off; and in the structure illustrated in FIG. 7, straight-down CCFL tubes are used to control the backlight per row section to control separately the backlight of each row section to be turned on and off.

The obtaining unit 3 is configured to obtain 3D images processed by the preprocessing unit 1. As described above, each image frame has a left-eye image and a right-eye image that are preprocessed in preprocessing unit 1 to a first left-eye image, a second left-eye image, a first right-eye image, and a second right-eye image, in a complementary format. In other words, the odd and even row sections of an original left-eye image (image of the left eye) are separated into two left-eye images having either odd or even row sections, i.e., in a complementary format. Similarly, the odd and even row sections of an original right-eye image are separated into two right-eye images having either odd or even row sections, i.e., in a complementary.

Since each of the 3D images includes the images of the left eye (left-eye image) and the images of the right eye (right-eye image), the preprocessing unit 1 splits the images of the left and right eyes into corresponding two images. In a specific embodiment, the image of the left eye is split into two images, where the first image is the first image of the left eye preserving the odd (or even) row section image of the original image of the left eye, and the other row sections of this image are black pictures; and the second image is the second image of the left eye preserving the even (or odd) row section image of the original image of the left eye, and the other row sections of this image are black pictures, and the combination of the first image of the left eye with the second image of the left eye can recover the original image of the left eye.

Similarly, the image of the right eye is split into the first image of the right eye and the second image of the right eye correspondingly preserving the odd (or even) row section image of the original image of the right eye. However, it shall be noted that when the images of the left and right eyes are processed in the same way, the displayed row sections of the first image resulting from splitting the image of the right (left) eye shall be complementary in format to those of the second image resulting from splitting the image of the left (right) eye, that is, if the second image of the left eye preserves the even row sections of the original image of the left eye, then the first image of the right eye shall preserve the odd row sections of the original image of the right eye.

The scanning control unit 4 is configured to scan sequentially the obtained first and second images of the left and right eyes according to the backlight source and the liquid crystal panel of which horizontal row sections are pre-divided and to the format and sequential order in which the images are output, and particularly includes a determining module 41 and a scanning control module 42.

The determining module 41 is configured to determine the format and sequential order in which the first and second images of the left and right eyes obtained in the obtaining unit 3 are output.

The scanning control module 42 is configured to scan each frame of image sequentially from the top to the bottom in the order determined by the determining module 41 according to the backlight source and the liquid crystal panel of which the horizontal row sections are pre-divided.

In the process of using the backlight control apparatus, the scanning control unit 4 therein is arranged on the liquid crystal panel 62 of the display device 6 and enabled in the process of scanning the images per row in the liquid crystal panel 62.

The backlight control unit 5 is configured, in the scanning process by the scanning control unit 4 and after a row section of one frame of image is scanned, i.e., after a odd or even row section image is preserved, to control the backlight of the row section to be turned on and then turned off until the same row section of a next frame of image starts to be scanned, i.e., turned off until a next image preserving the odd row sections or the even row sections starts to be scanned, and to repeat this process until the scanning process ends. It should be noted that the same row section of the next frame of image may not necessarily be a row section with a display picture.

Since an operation mode of the backlight control apparatus according to the embodiment of the invention relates to the output format of the 3D images (the obtained splitting format after processing) and the sequential order of obtaining the images of the left and right eyes, either the images of the left eye or the images of the right eye can be scanned firstly.

A non-limiting example will be disclosed as follows:

The 3D images are displayed by scanning firstly the image of the left eye and then the image of the right eye sequentially.

The image of the left eye is split into two images which are respectively the first image of the left eye obtained by preserving the odd row section image of the original image of the left eye and the second image of the left eye obtained by preserving the even row section image of the original image of the left eye. Similarly, the image of the right eye is split into two images, where the first image is obtained by preserving the odd row sections of the original image of the right eye and the second image is obtained by preserving the even row sections of the original image of the right eye.

When the scanning control unit 4 starts a scanning control, all row section of the backlight source 61 are turned off, and the scanning control unit 4 coupled to the liquid crystal panel 62 controls the scanning start with the first row of the first image of the left eye, because the liquid crystal panel 62 operates in a row scanning mode and the liquid crystal panel 62 and the backlight source 61 are divided consistently into N row sections.

When performing the scanning, firstly the first image of the left eye is scanned, then the second image of the left eye, the first image of the right eye and the second image of the right eye are scanned sequentially, then the first image of the left eye is scanned again, and this sequential scanning process is then repeated.

In the scanning process from the top row section to the bottom row section of the liquid crystal panel 62, the backlight source 61 is concurrently controlled dynamically so that for images preserving the odd row sections of the original images of the left and right eyes (e.g., L1 and R1 illustrated in FIG. 9), the backlight of a first odd row section of a first frame of image is turned on after the row section is scanned, until the same row section of the second frame of image subsequent thereto, i.e., a first odd row section starts to be scanned, and then the backlight corresponding to the first odd row section of the first frame of image is turned off; and for images preserving the even row sections of the original images of the left and right eyes (e.g., L2 and R2 illustrated in FIG. 9), the backlight of a first even row section of a first frame of image is turned on after the row section is scanned, until the same row section of a second frame of image subsequent thereto, i.e., a first even row section of the second frame of image, starts to be scanned, and then the backlight corresponding to the first even row section of the first frame of image is turned off.

In summary, after a row section of a frame of image is scanned, an initialized backlight of a row section is controlled to be turned on and then turned off until the same row section of a next frame of image starts to be scanned, and this process is repeated sequentially until all the images are scanned. It shall be noted that the same row section of the next frame of image may not necessarily be a row section with a display picture.

In backlight control by the foregoing apparatus according to the embodiment of the invention, the backlight source is controlled dynamically per row section to lower the power consumption of the backlight source and the system and also display the 3D images without any crosstalk.

Furthermore, the foregoing apparatus according to the embodiment of the invention further includes a first backlight control unit which can be used in cooperation with a pair of shutter glasses having a left eyeglass and a right eyeglass. The first backlight control unit is configured to control the left eyeglass of the shutter glasses to be open and the right eyeglass to be closed when the scanning image is the image of the left eye; and to control the right eyeglass of the shutter glasses to be open and the left eyeglass to be closed when the scanning image is the image of the right eye.

For cooperation with a 3D display system with an active polarization light valve, the apparatus according to the embodiment of the invention further includes a second backlight control unit configured to control the active polarization light valve in the 3D display system to be open when the scanning image is the image of the left eye and to control the active polarization light valve to be closed when the scanning image is the image of the right eye; or to control the active polarization light valve in the 3D display system to be open when the scanning image is the image of the right eye and to control the active polarization light valve in the 3D display system to be closed when the scanning image is the image of the left eye.

With various settings in the foregoing backlight control apparatus according to the embodiment of the invention, the backlight source can be controlled dynamically per row section, the 3D images can be displayed without any crosstalk and the power consumption of the backlight source can be lowered, and also the backlight control apparatus can be used with both the shutter glasses and the active polarization 3D system.

Second Embodiment

Figure 8:
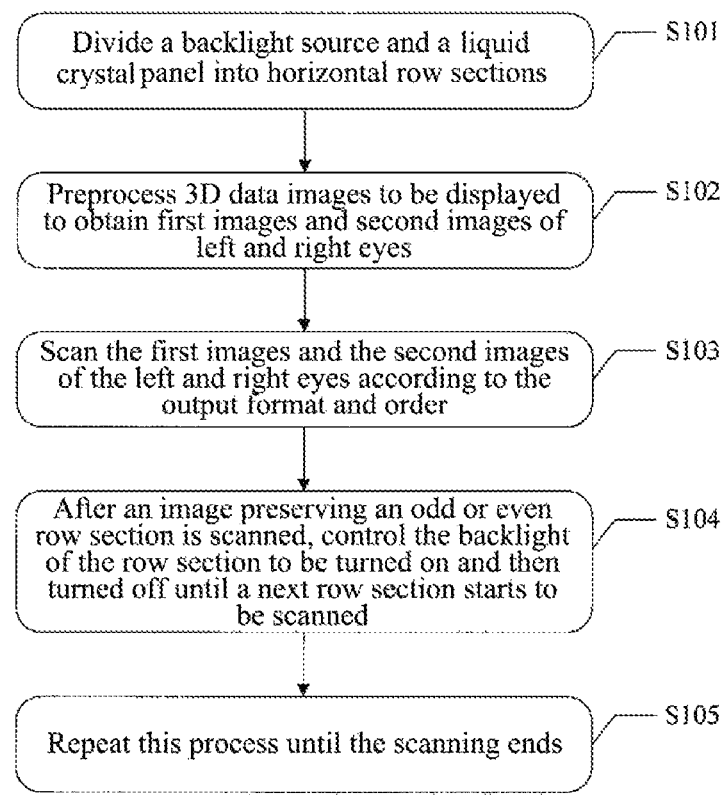
FIG. 8 is a flow chart of a backlight control method according to an embodiment of the invention.

The backlight control apparatus has been described in details in the above embodiment of the invention, and based upon this apparatus, the invention further discloses a backlight control method of a backlight control apparatus, and referring to FIG. 8 illustrating a flow chart of a backlight control method according to an embodiment of the invention, the method is shown as including the following steps:

At S101, a backlight source and an associated crystal liquid panel are divided into N row sections.

At S102, each of the 3D images is preprocessed to obtain a first image of a left eye, a second image of the left eye, a first image of a right eye and a second image of the right eye preserving odd and even row section images of original images of the left and right eyes. The images are then output in a complementary format, i.e., images with odd-numbered row sections and images even-numbered row sections are output. Each image is one frame of image.

Since a 3D data image includes an image of the left eye and an image of the right eye, preprocessing a 3D image includes separating (splitting) the image of the left eye and the image of the right eye into a first image of the left eye and a second image of the left eye, as well as a first image of the right eye and a second image of the right eye, respectively. The first and second images are output in the complementary format, preserving the original image of the left eye as well as the first image of the right eye. It shall be noted that each image resulting from splitting is one frame of image.

At S103, the first images of the left and the right eyes and the second images of the left and the right eyes corresponding to the images of the left and right eyes are sequentially scanned starting from the top row section to the bottom row section of the liquid crystal panel according to the backlight source and the liquid crystal panel in the sequential order in which the first images and the second images of the left and the right eyes are output.

At S104, after a row section of a frame of image is scanned, an initialized backlight of the row section is controlled to be turned on and then turned off until the same row section of a next frame of image starts to be scanned, and this process is repeated sequentially until all the images are scanned, where the same row section of the next frame of image may not necessarily be a row section with a display picture.

It should be noted that the row sections of the backlight source are initially turned off when step S104 is performed for scanning.

Furthermore, the control of the backlight source, i.e., a period of time for which the backlight is turned on, in the scanning process generally involves the following two scenarios:

In a first scenario, after a row section of the frame of preserved image is scanned, the initialized backlight of the row section is controlled to be turned on immediately, that is, the backlight source corresponding to the row section is turned on directly.

In a second scenario, after a row section of the frame of preserved image is scanned, the initialized backlight of the row section is controlled, after a predetermined delay time t, to be turned on, that is, the backlight source corresponding to the row section is turned on after the predetermined delay time t.

The above predetermined delay time t is defined by the following expression:

$$t \leq (N-1)/N * T;$$

Where T represents a period of one frame, and N represents the number of horizontal row sections into which the backlight source and the liquid crystal panel are divided.

The step S105 is to repeat the step S104 until all the images, i.e., the first images of the left and the right eyes and the second images of the left and the right eyes corresponding to the images of the left and right eyes, are scanned.

With the backlight control method according to the embodiment of the invention, dynamic control per row section is used in cooperation with image processing and display processes to reduce residual images and achieve a crosstalk-free 3D display while lowering the power consumption of both the backlight source and the system.

It should be noted that the 3D data images including the images of the left and right eyes are preprocessed to obtain respectively the first images and the second images preserving complementarily the original images of the left and right eyes in an output format of the odd and even row section images, and the scanning process is performed in the determined sequential order, and since the first images and the second images of the images of the left and right eyes are output in different formats and obtained in different sequential orders, they will be described respectively below.

Figure 9:
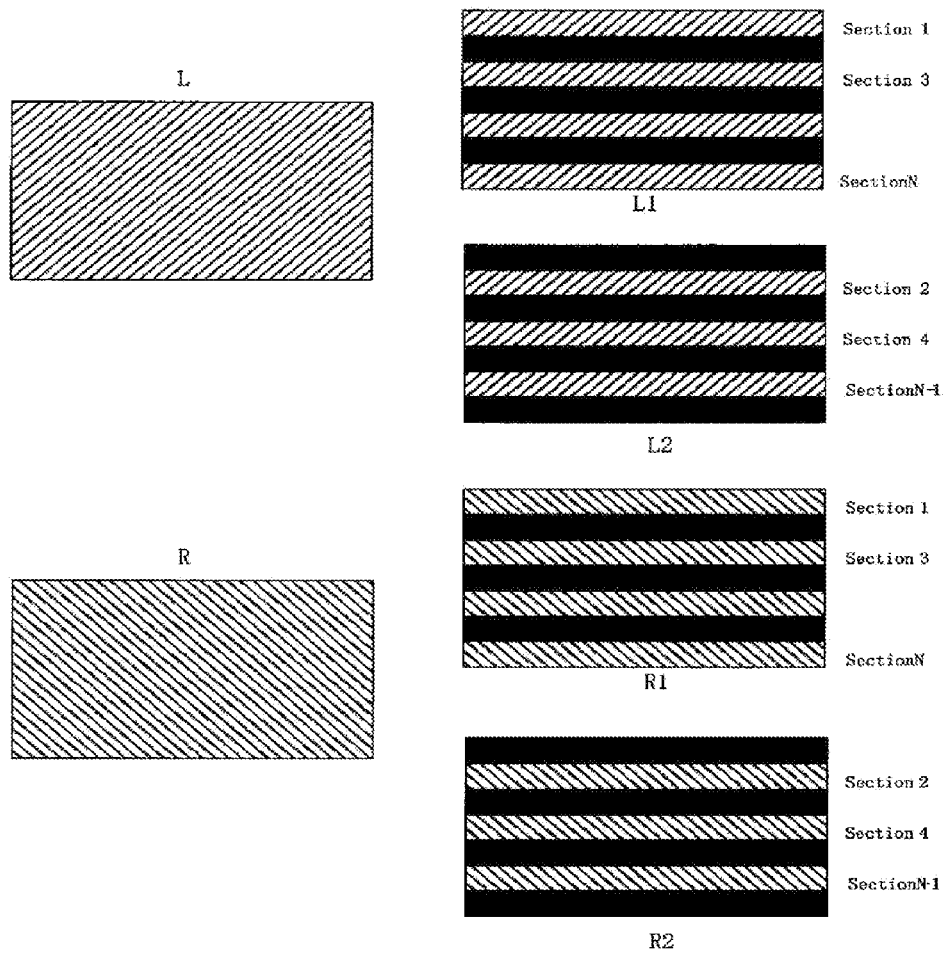
FIG. 9 is a schematic diagram of a scheme to preprocess 3D data images according to an embodiment of the invention.

In preprocessing of the 3D data images, the image of the left eye is split into two images as follows:

The first image of the left eye preserves the odd row section image of the original image of the left eye, and the other row sections thereof are black pictures, and the second image of the left eye preserves the even row section image of the original image of the left eye, and the other row sections thereof are black pictures; and the image of the right eye is split in the same way as splitting the image of the left eye, and the displayed row sections of the first image of the right eye resulting from splitting are complementary in format to those of the second image of the left eye. The foregoing first images and second images of the left and right eyes constitute together the original images of the left and right eyes, and firstly the first images and then the second images are displayed in the scanning and display processes. Reference can be made to FIG. 9 for a specific format where L represents a frame of image of the left eye, L1 represents the first image of the left eye, L2 represents the second image of the left eye, R represents a frame of image of the right eye, R1 represents the first image of the right eye, R2 represents the second image of the right eye, and Section represents the row number.

When the images are obtained in an order of firstly the image of the left eye and then the image of the right eye:

The first image of the left eye, the second image of the left eye, the first image of the right eye and the second image of the right eye are scanned sequentially.

In an initial status, all the backlight sources are in turn-off status, and the liquid crystal panel is ready to scan starting with the first image of the left eye preserving the odd row section image, and after a first odd row section of the first image of the left eye is scanned, the backlight corresponding to the odd row section is controlled to be turned on and then turned off until a first odd row section of the second image of the left eye subsequent thereto starts to be scanned, and this process is repeated to perform the scanning.

When the second image of the left eye preserving the even row section image is scanned, in the same way, after a first even row section of the second image of the left eye is scanned, the backlight corresponding to the even row section is controlled to be turned on and then turned off until a first even row section of the first image of the right eye subsequent thereto starts to be scanned, and this process is repeated until the first image of the right eye starts to be scanned.

The backlights corresponding to the odd and even row sections of the first image of the right eye and the second image of the right eye are controlled repeatedly in the same backlight control way until the images of the left and right eyes are already scanned.

When the images are obtained in an order of firstly the image of the right eye and then the image of the left eye:

The first image of the right eye, the second image of the right eye, the first image of the left eye and the second image of the left eye are scanned sequentially.

In an initial state, all the backlight sources are turned off, and the liquid crystal panel is ready to scan starting with the first image of the right eye preserving the odd row section image, and after a first odd row section of the first image of the right eye is already scanned, the backlight corresponding to the odd row section is controlled to be turned on and then turned off until a first odd row section of the second image of the right eye subsequent thereto starts to be scanned, and this process is repeated to perform the scanning.

When the second image of the right eye preserving the even row section image is scanned, in the same way, after a first even row section of the second image of the right eye is already scanned, the backlight corresponding to the even row section is controlled to be turned on and then turned off until a first even row section of the first image of the left eye subsequent thereto starts to be scanned, and this process is repeated until the first image of the left eye starts to be scanned.

The backlights corresponding to the odd and even row sections of the first image of the left eye and the second image of the left eye are controlled repeatedly in the same backlight control way until the images of the left and right eyes are already scanned.

In preprocessing of the 3D data images, the image of the left eye is split into two images as follows:

The first image of the left eye preserves the even row section image of the original image of the left eye, and the other row sections thereof are black pictures, and the second image of the left eye preserves the odd row section image of the original image of the left eye, and the other row sections thereof are black pictures; and the image of the right eye is split in the same way as splitting the image of the left eye, and the displayed row sections of the first image of the right eye resulting from splitting are complementary in format to those of the second image of the left eye. The foregoing first images and second images of the left and right eyes constitute together the original images of the left and right eyes, and firstly the first images and then the second images are displayed in the scanning and display processes.

When the images are obtained in an order of firstly the image of the left eye and then the image of the right eye:

The first image of the left eye, the second image of the left eye, the first image of the right eye and the second image of the right eye are scanned sequentially.

In an initial state, all the backlight sources are turned off, and the liquid crystal panel is ready to scan starting with the first image of the left eye preserving the even row section image, and after a first even row section of the first image of the left eye is already scanned, the backlight corresponding to the even row section is controlled to be turned on and then turned off until a first even row section of the second image of the left eye subsequent thereto starts to be scanned, and this process is repeated to perform the scanning.

When the second image of the left eye preserving the odd row section image is scanned, in the same way, after a first odd row section of the second image of the left eye is already scanned, the backlight corresponding to the odd row section is controlled to be turned on and then turned off until a first odd row section of the first image of the right eye subsequent thereto starts to be scanned, and this process is repeated to perform the scanning.

The backlights corresponding to the odd and even row sections of the first image of the right eye and the second image of the right eye are controlled repeatedly in the same backlight control way until the images of the left and right eyes are already scanned.

When the images are obtained in an order of firstly the image of the right eye and then the image of the left eye:

The first image of the right eye, the second image of the right eye, the first image of the left eye and the second image of the left eye are scanned sequentially.

In an initial state, all the backlight sources are turned off, and the liquid crystal panel is ready to scan starting with the first image of the right eye preserving the even row section image, and after a first even row section of the first image of the right eye is already scanned, the backlight corresponding to the even row section is controlled to be turned on and then turned off until a first even row section of the second image of the right eye subsequent thereto starts to be scanned, and this process is repeated to perform the scanning.

When the second image of the right eye preserving the odd row section image is scanned, in the same way, after a first odd row section of the second image of the right eye is already scanned, the backlight corresponding to the odd row section is controlled to be turned on and then turned off until a first odd row section of the first image of the left eye subsequent thereto starts to be scanned, and this process is repeated to perform the scanning.

The backlights corresponding to the odd and even row sections of the first image of the left eye and the second image of the left eye are controlled repeatedly in the same backlight control way until the images of the left and right eyes are already scanned.

It should be noted that when the scanning proceeds from one image to another image, if the last row section of the preceding image preserves the odd or even row section image, then the backlight corresponding to the last row section of the preceding image is controlled to be turned off before the first row section of the succeeding image preserving the odd or even row section image starts to be scanned.

In the foregoing embodiment of the invention, the 3D data images are preprocessed, and the backlights corresponding to the images of the left and right eyes resulting from different splitting approaches are controlled in the scanning process, that is, the invention performs dynamic control on the row sections of the backlight source in cooperation with image processing and display to thereby reduce residual images and achieve a crosstalk-free 3D effect while lowering the power consumption of both the backlight source and the system.

Furthermore, in the process of achieving a crosstalk-free 3D effect in the backlight control approach in the foregoing embodiment of the invention, for cooperation with shutter glasses, the left eyeglass of the shutter glasses is controlled to be opened and the right eyeglass is controlled to be closed when the scanning image is the image of the left eye; and the right eyeglass of the shutter glasses is controlled to be opened and the left eyeglass is controlled to be closed when the scanning image is the image of the right eye.

Furthermore, in the process of achieving a crosstalk-free 3D effect in the backlight control approach in the foregoing embodiment of the invention, for cooperation with an active polarization light valve in a 3D display system, the active polarization light valve is controlled to be opened when the scanning image is the image of the left eye, and the active polarization light valve is controlled to be closed when the scanning image is the image of the right eye. Alternatively, the active polarization light valve in the 3D display system is controlled to be open when the scanning image is the image of the right eye, and the active polarization light valve in the 3D display system is controlled to be closed when the scanning image is the image of the left eye.

With the foregoing method according to the embodiment of the invention, dynamic control is performed on the row sections of the backlight source to thereby lower a response speed of liquid crystals as required for shutter glasses, and shutter glasses with liquid crystals in a TN pattern can be used in cooperation with reception of 3D images to thereby facilitate a lowered usage cost of both the shutter glasses and the system. Furthermore, the backlight control method and apparatus according to the embodiments of the invention are also applicable in compatibility with both shutter glasses and an active polarization 3D system, thereby gaining a wider applicability scope thereof.

Based upon the backlight control apparatus and method described above in details in the embodiments of the invention, the invention further discloses a 3D display system which mainly includes a display device, 3D glasses and the backlight control apparatus disclosed in the above embodiment, where the backlight control apparatus processes and displays 3D images in the backlight control method disclosed above in the embodiment of the invention. To further detail the description, the system will be described below in embodiments thereof.

Figure 10:
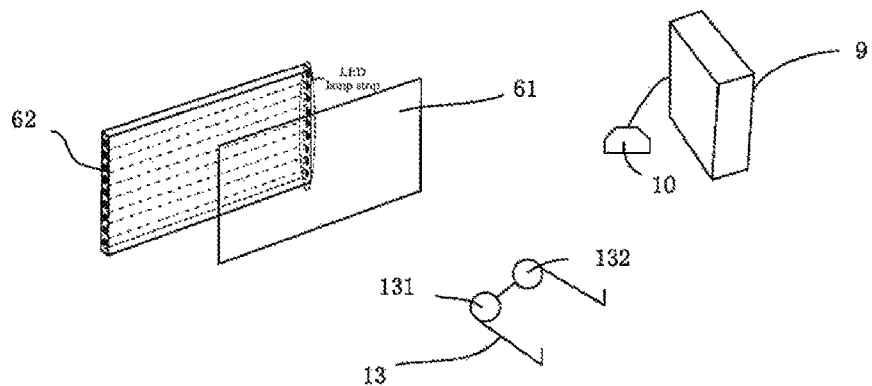
FIG. 10 is a schematic structural diagram of a 3D display system according to an embodiment of the invention.

A non-limiting example embodiment is described below. Referring to FIG. 10, a 3D display system according to an embodiment of the invention includes, in part, a backlight control apparatus, a computer 9, an infrared transmitter 10 and shutter glasses 13 (including a left eyeglass 131 and a right eyeglass 132).

A display device 6 in the backlight control apparatus includes a backlight source 61 and a liquid crystal panel 62, and the backlight source 61 is an LED backlight source having following characteristics: two LED lamp strips with incident light being Y side-directed are used, and the backlight is controlled per row section in cooperation with an arrangement of light guidance plates to separately control the backlight corresponding to each row section to be turned on and off.

In the example embodiment, the backlight source 61 is divided into three light row sections, and accordingly, the liquid crystal panel 62 is also divided into three row sections, each corresponding to one of the three light row sections.

A display card of the computer 9 is configured to output a signal of processed 3D data images to the liquid crystal panel 62; the infrared transmitter 10 is configured to transmit a frame frequency synchronization signal of the images to the shutter glasses 13; and the shutter glasses 13 are integrated with an infrared signal receiver thereon through which the synchronization signal of the infrared transmitter is received, so that the backlight control apparatus controls the left and right eyeglasses to be opened and closed.

Since an operation mode of backlight control relates to the output format of the 3D images and the sequential order of obtaining the images of the left and right eyes, either the images of the left eye or the images of the right eye can be scanned firstly.

Figure 11:
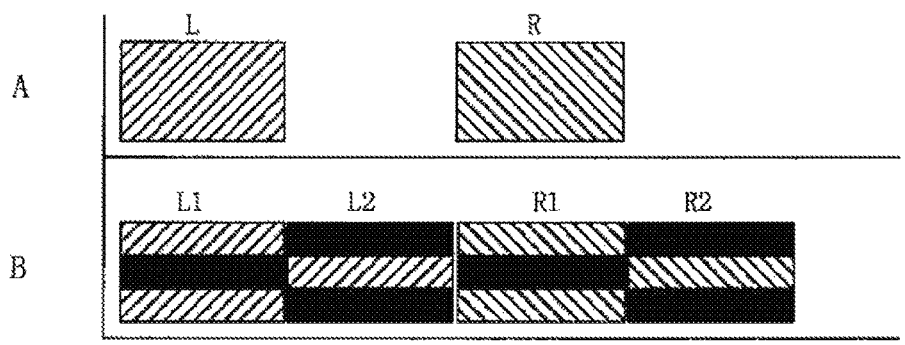
FIG. 11 is a schematic diagram of a sequence to process and display 3D images in the system illustrated in FIG. 10 according to an embodiment of the invention.

FIG. 11 shows an example of an embodiment, where the reference character "A" represents the unprocessed 3D data images, and the reference character "B" represents the processed 3D images). Firstly, the image of the left eye and then the image of the right eye among the 3D images are displayed and the displayed images are then sequentially scanned and backlight-controlled repeatedly.

As can be seen from FIG. 11, the image of the left eye is split into two images (L1, L2), where L1 is obtained by preserving the odd row section image of the original image of the left eye and L2 is obtained by preserving the even row section image of the original image of the left eye. Also, the image of the right eye is split into two images (R1, R2), where R1 is obtained by preserving the odd row section image of the original image of the right eye and R2 is obtained by preserving the even row section image of the original image of the right eye.

The light row sections of the backlight source are initially turned off, and the liquid crystal panel 62 scans starting with the first row of the first image L1 of the left eye, and then the second image L2 of the left eye, the first image R1 of the right eye and the second image R2 of the right eye are scanned sequentially; and next the first image L1 of the left eye is scanned again, and this scanning process is repeated until all images have been scanned. The liquid crystal panel 62 scans from the top row section to the bottom row section, and the backlight control apparatus controls the backlight to be turned on and off in the scanning process in the timing diagram as illustrated in FIG. 12:

After the first row section of the L1 image has been scanned, the backlight of the first row section is turned on and then turned off until the first row section of the L2 image starts to be scanned; after the third row section of the L1 image is already scanned, the backlight of the third row section is turned on and then turned off until the third row section of the L2 image starts to be scanned; after the second row section of the L2 image is already scanned, the backlight of the second row section is turned on and then turned off until the second row section of the R1 image starts to be scanned; after the first row section of the R1 image is scanned, the backlight of the first row section is turned on again and then turned off again until the first row section of the R2 image starts to be scanned; after the third row section of the R1 image is already scanned, the backlight of the third row section is turned on and then turned off until the third row section of the R2 image starts to be scanned; and after the second row section of the R2 image is already scanned, the backlight of the second row section is turned on and then turned off until the second row section of the first image of the left eye (not illustrated in figure) of the next subsequent frame starts to be scanned. In the process of scanning the images, the backlight is controlled by performing dynamic control on the row sections of the backlight source repeatedly in the foregoing timing sequence.

Figure 12:
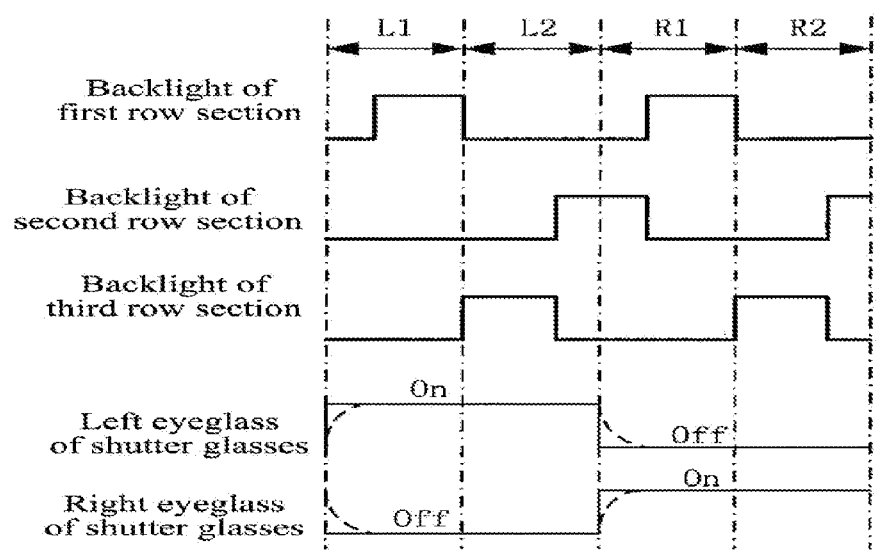
FIG. 12 is a timing diagram of backlight control in the system illustrated in FIG. 10 according to an embodiment of the invention.

The shutter glasses 13 in the 3D display system according to the embodiment is open and closed in the timing sequence as illustrated in FIG. 12: the left eyeglass is open (on) at the starting time of the L1 frame and then closed (off) until the end of the L2 frame; and the right eyeglass is open (on) at the starting time of the R1 frame and then closed (off) until the end of the R2 frame.

Figure 13:
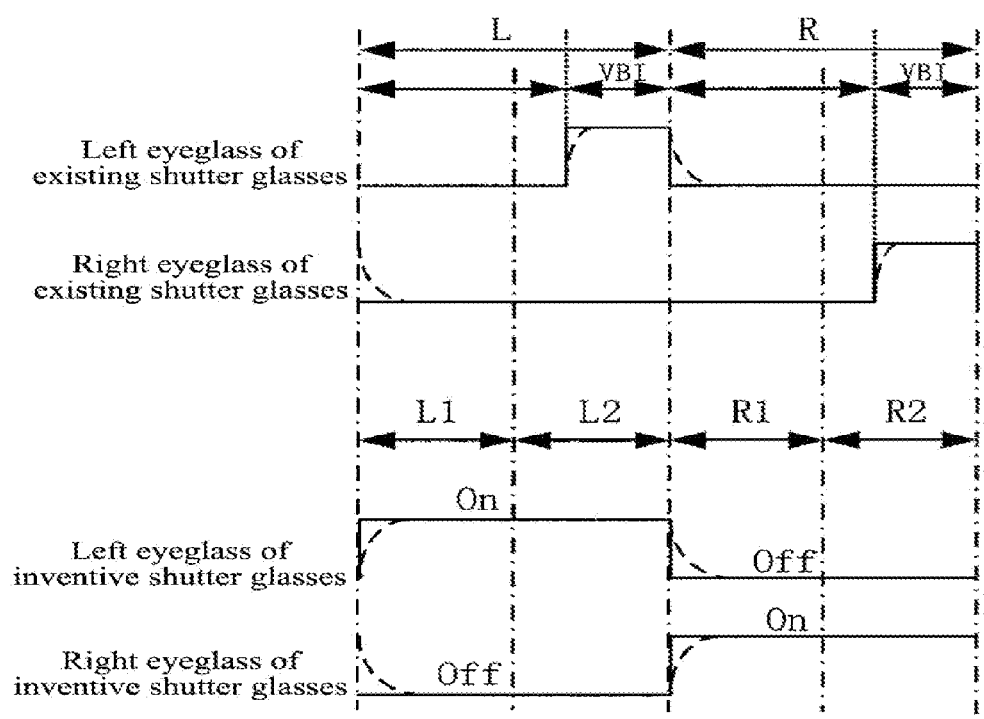
FIG. 13 is a contrast timing diagram of backlight control of shutter glasses in the system illustrated in FIG. 10 according to an embodiment of the invention and that in the prior art.

Control of the shutter glasses in the backlight control method above according to the embodiment of the invention is compared with that in the prior art as illustrated in FIG. 13. Conventional shutter glasses are open (on) only in the period of VBI, and there is a very short response time available to the liquid crystals. There is a loss of brightness because opening of the eyeglasses is delayed due to the response time required for the liquid crystals. Furthermore, there is a delay in closing (off) the eyeglasses due to the response time required for the liquid crystals. The images of the left and right eyes may be visible at the same time to a viewer, thus resulting in considerable crosstalk.

According to embodiments of the present invention, the shutter glasses can be open (on) once the first frame of the left eye or the right eye starts and then closed (off) until the second frame of the left eye or the right eye ends to significantly lower the requirement on the response time of the liquid crystals. Liquid crystals in a TN pattern can thus be used for the shutter glasses, and a crosstalk-free 3D display can also be achieved without requiring the use of quick responding liquid crystals to reduce or eliminate crosstalk between the images of the left and right eyes.

Comparing with the prior art techniques, embodiments of the present invention can lower power consumption and also improve the effect of displaying a dynamic image under dynamic backlight control through scanning.

Figure 14:
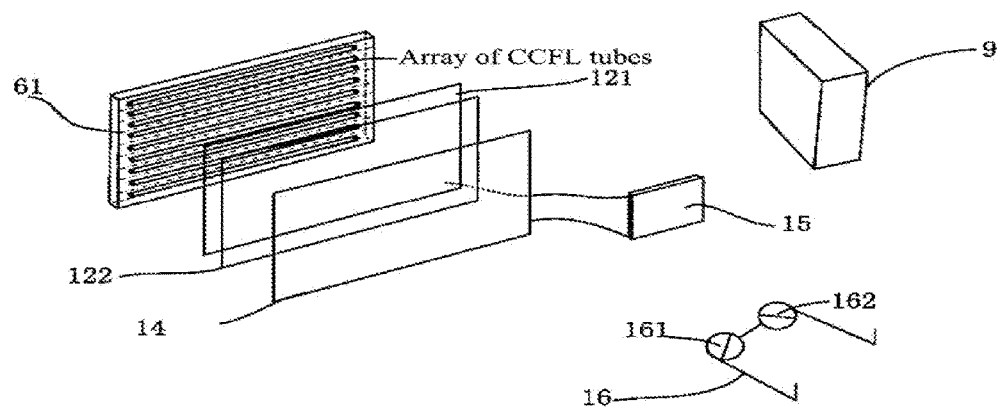
FIG. 14 is a schematic structural diagram of a 3D display system according to an embodiment of the invention.

Another example embodiment is described as follows:

As illustrated in FIG. 14, a 3D display system according to this exemplary embodiment includes a backlight control apparatus, an active polarization light valve 14, a valve control system 15, a computer 9 and polarization glasses 16 (including a left eyeglass 161 and a right eyeglass 162).

A display device 6 in the backlight control apparatus includes a backlight source 61 and a liquid crystal panel, where the structure of backlight source 61 is a straight-down CCFL backlight source in cooperation with diffusion plates and diffusion sheets to control separately the backlight corresponding to each row section to be turned on and off.

Figure 15:
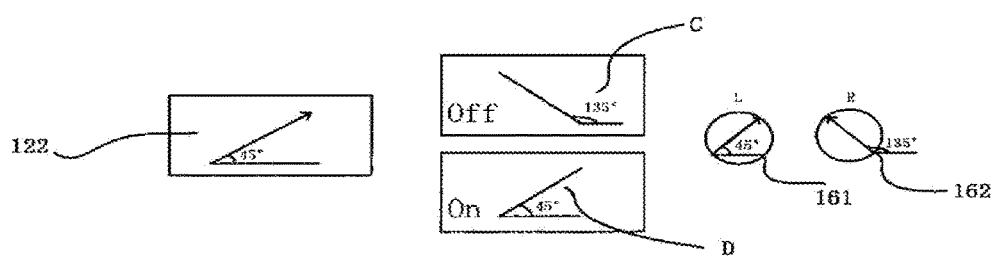
FIG. 15 is an optics principle diagram of an active polarization 3D system according to an embodiment of the invention.

In this example, the backlight source 61 is divided into three light row sections, and the liquid crystal panel 62 is also divided into three row sections, each corresponding to one of the light row sections. Referring to FIG. 15, the liquid crystal panel includes a lower polarized plate 121 and an upper polarized plate 122. The polarization direction of the upper polarized plate is 45°.

The active polarization light valve 14 is fitted closely on the upper polarized plate 122 for acting as an active polarization rotator to actively control the polarization state of emergent light. The active polarization light valve 14 can alternatively be replaced by another device capable of actively controlling polarization rotation or rotating light, but is limited to the liquid crystal light valve mentioned in this example embodiment. Thus, the liquid crystal light valve can be replaced by liquid crystal light valves, lithium niobate photoelectric modulators, Faraday rotators, and the like.

The liquid crystal light valve in this example embodiment includes upper and lower substrates with a liquid crystal layer sandwiched therebetween. When there is no potential difference between the upper and lower substrates, the light valve is in a closed (off, opaque) state, and at this time the polarization direction of transmitted light is the same as the polarization direction of the upper polarized plate (as illustrated with C in FIG. 15). When there is a potential difference between the upper and lower substrates of the light valve, the light valve is in an open (on, transparent) state, and at this time the polarization direction of transmitted light is orthogonal to the polarization direction of the upper polarized plate (as illustrated with D in FIG. 15). The polarization directions of the left and right eyeglasses of the polarization glasses 16 correspond respectively to the polarization statuses of the transmitted light when the light valve is closed and open.

Figure 16:
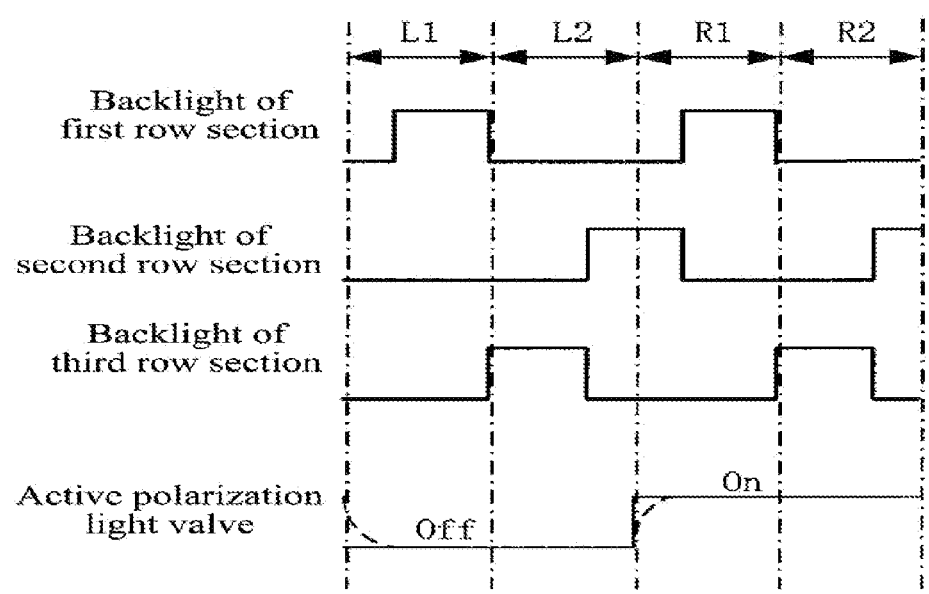
FIG. 16 is a timing diagram of backlight control in the system illustrated in FIG. 13 according to an embodiment of the invention.

A display card of the computer 9 is configured to output a signal of processed 3D images to the liquid crystal panel 62. The light valve control system 15 is configured to receive a frame frequency synchronization signal of the images from the liquid crystal panel 62 and transmitting the signal to the active polarization light valve, so that the backlight control apparatus controls the light valve to be open and closed in the timing sequence as illustrated in FIG. 16. At this time a crosstalk-free 3D image can be seen through the polarization glasses.

A specific operation principle of the present invention is described below.

In an example embodiment, the split images in the preceding example are taken as an example, that is, as illustrated in FIG. 11 (A represents the unprocessed 3D data images, and B represents the processed 3D data images), firstly the image of the left eye and then the image of the right eye among the 3D data images are displayed and sequentially scanned and backlight-controlled repeatedly.

As can be seen from FIG. 11, the image of the left eye is split into two images (L1, L2), where L1 is obtained by preserving the odd row section image of the original image of the left eye and L2 is obtained by preserving the even row section image of the original image of the left eye. Also the image of the right eye is split into two images (R1, R2), where R1 is obtained by preserving the odd row section image of the original image of the right eye and R2 is obtained by preserving the even row section image of the original image of the right eye.

In an initial state, all the light row sections of the backlight source are turned off, and the liquid crystal panel scans starting with the first row of the first image L1 of the left eye, and then the second image L2 of the left eye, the first image R1 of the right eye and the second image R2 of the right eye are scanned sequentially; and next the first image L1 of the left eye is scanned again, and this process is repeated until the scanning ends. The liquid crystal panel scans from the top row section to the bottom row section, and the backlight control apparatus controls the backlight to be turned on and off in the scanning process in the timing diagram as illustrated in FIG. 16: after the first row section of the L1 image is already scanned, the backlight of the first row section is turned on and then turned off until the first row section of the L2 image starts to be scanned; after the third row section of the L1 image is already scanned, the backlight of the third row section is turned on and then turned off until the third row section of the L2 image starts to be scanned; after the second row section of the L2 image is already scanned, the backlight of the second row section is turned on and then turned off until the second row section of the R1 image starts to be scanned; after the first row section of the R1 image is scanned, the backlight of the first row section is turned on again and then turned off again until the first row section of the R2 image starts to be scanned; after the third row section of the R1 image is already scanned, the backlight of the third row section is turned on and then turned off until the third row section of the R2 image starts to be scanned; and after the second row section of the R2 image is already scanned, the backlight of the second row section is turned on and then turned off until the second row section of the first image of the left eye (not illustrated) of the next subsequent frame starts to be scanned. In the process of scanning the images, the backlight is controlled by performing dynamic control on the row sections of the backlight source repeatedly in the foregoing timing sequence.

The active polarization light valve 14 in the 3D display system according to this embodiment is opened and closed in the timing sequence as illustrated in FIG. 16: the light valve is in a closed (off) state at the starting time of the L1 frame and then turned into an open (on) state until the end of the L2 frame, that is, the light valve is open (on) at the starting time of the R1 frame and then closed (off) until the end of the R2 frame, and a crosstalk-free 3D image can be viewed using a pair of polarization glasses.

As compared with the prior art, this example embodiment based on the foregoing described backlight control method can be combined with a CCFL backlight source and an active polarization 3D system and the use of inexpensive polarization glasses can lower the system costs and usage costs. Polarization glasses are characterized as to provide energy saving, environment protection, light weight, that are superior to shutter glasses.

The respective embodiments have been described progressively in the specification, each of the embodiments has laid an emphasis on its difference(s) from the other embodiments, and mutual reference can be made to the description of the same or similar part(s) between the respective embodiments.

The foregoing description of the disclosed embodiments enables those skilled in the art to practice or use the invention. It will be understood by those skilled in the art that various modifications may be made therein without departing from the spirit or scope of the invention. Accordingly the invention will not be limited to these embodiments illustrated herein but shall be defined by the following claims.

What is claimed is:

1. A method for controlling a backlight source for a liquid crystal panel, row sections of the backlight source lighting row sections of the liquid crystal panel, both having a same number of row sections, the method comprising:
    obtaining and preprocessing 3D image frames, each of the 3D image frames having a left-eye image and a right-eye image;
    dividing the left-eye image into a first left-eye image including odd row sections and a second left-eye image including even row sections, and dividing the right-eye image into a first right-eye image including odd row sections and a second right-eye image including even row sections, wherein the even row sections of the first left-eye image and the first right-eye image, and the odd row sections of the second left-eye image and the second right-eye image are black pictures;
    or dividing the left-eye image into a first left-eye image including even row sections and a second left-eye image including odd row sections, and dividing the right-eye image into a first right-eye image including even row sections and a second right-eye image including odd row sections, wherein the odd row sections of the first left-eye image and the first right-eye image, and the even row sections of the second left-eye image and the second right-eye image are black pictures;
    scanning sequentially the first and second left-eye images and the first and second right-eye images;
    controlling an initialized backlight of a row section to be turned on and then turned off before moving to the same row section of a next image; and
    repeating the scanning until all images are scanned.

2. The method according to claim 1, wherein the controlling the initialized backlight comprises:
    turning on the initialized backlight of the row section without a time delay; or
    turning on the initialized backlight of the row section with a delay time t, the delay time t satisfying the expression $t \leq (N-1)/N*T$, wherein T represents a time period of one image, and N represents a number of horizontal row sections into which the backlight source and the liquid crystal panel are divided.

3. The method according to claim 2, wherein the scanning sequentially the first and second left-eye images and the first and second right-eye images comprises:
    determining that the images are obtained in an order of firstly the left-eye image and then the right-eye image or firstly the right-eye image and then the left-eye image, the left-eye image including the first left-eye image preserving an odd row section image and the second left-eye image preserving complementarily an even row section image; and the right-eye image including the first right-eye image and the second right-eye image respectively preserving the odd or even row section images; and scanning each image sequentially from a top row to a bottom row until all the images are scanned.

4. The method according to claim 2, wherein the scanning sequentially the first and second left-eye images and the first and second right-eye images comprises:

determining that the images are obtained in an order of firstly the left-eye image and then the right-eye image or firstly the right-eye image and then the left-eye image, the left-eye image including the first left-eye image preserving an even row section image and the second left-eye image preserving complementarily an odd row section image; and the right-eye image including the first right-eye image and the second right-eye image respectively preserving the odd or even row section images; and scanning each image sequentially from a top row to a bottom row until all the images are scanned.

5. The method according to claim 2, further comprising:
controlling, in cooperation with a pair of shutter glasses, a left eyeglass of the pair of shutter glasses to be open and a right eyeglass of the pair of shutter glasses to be closed when the scanning image is the left-eye image; and controlling the right eyeglass to be open and the left eyeglass to be closed when the scanning image is the right-eye image.

6. The method according to claim 2, further comprising:
scanning the images in cooperation with an active polarization light valve;
controlling the active polarization light valve to be open when the scanning image is the left-eye image; and
controlling the active polarization light valve to be closed when the scanning image is the right-eye image; or
controlling the active polarization light valve to be opened when the scanning image is the right-eye image; and
controlling the active polarization light valve to be closed when the scanning image is the left-eye image.

7. The method according to claim 2, wherein when an image is the second left-eye image preserving the odd row sections, the next image is the first right-eye image; and
after a first odd row section of the second left-eye image is scanned, controlling the initialized backlight of the row section to be turned on and then turned off when a first odd row section of the first right-eye image starts to be scanned; and
repeating the turning on and off of the initialized backlight until all the images are scanned.

8. The method according to claim 1, wherein the backlight source and the liquid crystal panel each are divided into N horizontal row sections, N being a number greater than or equal to 3.

9. The method according to claim 1, wherein the scanning sequentially the first and second left-eye images and the first and second right-eye images comprises:

determining that the images are obtained in an order of firstly the left-eye image and then the right-eye image or firstly the right-eye image and then the left-eye image; the left-eye image including the first left-eye image preserving an odd row section image and the second left-eye image preserving complementarily an even row section image; and the right-eye image including the first right-eye image and the second right-eye image preserving the odd or even row section images consistently with the first left-eye image and the second left-eye image respectively; and scanning each image sequentially from a top row to a bottom row until all images are scanned.

10. The method according to claim 1, wherein the scanning sequentially the first and second left-eye images and the first and second right-eye images comprises:

determining that the images are obtained in an order of firstly the left-eye image and then the right-eye image or firstly the right-eye image and then the left-eye image; the left-eye image including the first left-eye image preserving an even row section image and the second left-eye image preserving complementarily an odd row section image; and the right-eye image including the first right-eye image and the second right-eye image preserving the odd or even row section images consistently with the first left-eye image and the second left-eye image respectively; and scanning each image sequentially from a top row to a bottom row until all the images are scanned.

11. The method according to claim 1, further comprising:
controlling, in cooperation with a pair of shutter glasses, a left eyeglass of the pair of shutter glasses to be open and a right eyeglass of the pair of shutter glasses to be closed when the scanning image is the left-eye image; and controlling the right eyeglass to be open and the left eyeglass to be closed when the scanning image is the right-eye image.

12. The method according to claim 1, further comprising:
scanning the images in cooperation with an active polarization light valve; and
controlling the active polarization light valve to be open when the scanning image is the left-eye image; and
controlling the active polarization light valve to be closed when the scanning image is the right-eye image; or
controlling the active polarization light valve to be open when the scanning image is the right-eye image; and
controlling the active polarization light valve to be closed when the scanning image is the left-eye image.

13. The method according to claim 1, wherein when an image is the second left-eye image preserving the odd row sections, the next image is the first right-eye image; and
after a first odd row section of the second left-eye image is scanned, controlling the initialized backlight of the row section to be turned on and then turned off when a first odd row section of the first right-eye image starts to be scanned; and
repeating the turning on and off of the initialized backlight until all the images are scanned.

14. A backlight control apparatus for controlling a backlight source for a liquid crystal panel, row sections of the backlight source lighting row sections of the liquid crystal panel in a one-to-one corresponding relationship, the apparatus comprising:

an obtaining unit configured to obtain preprocessed 3D images, each of the 3D images having a left-eye image and a right-eye image;

a preprocessing unit configured to divide the left-eye image into a first left-eye image including odd row sections and a second left-eye image including even row sections, and divide the right-eye image into a first right-eye image including odd row sections and a second right-eye image including even row sections, wherein the even row sections of the first left-eye image and the first right-eye image, and the odd row sections of the second left-eye image and the second right-eye image are black pictures;

or divide the left-eye image into a first left-eye image including even row sections and a second left-eye image including odd row sections, and divide the right-eye image into a first right-eye image including even row sections and a second right-eye image including odd row sections, wherein the odd row sections of the first left-eye image and the first right-eye image, and the even row sections of the second left-eye image and the second right-eye image are black pictures;

a scanning control unit configured to scan sequentially the first and second left-eye images and the first and second right-eye images; and a backlight control unit configured, after a row section of one image is scanned, to control an initialized backlight of the row section to be turned on and then turned off when the same row section of a next image starts to be scanned, and to repeat the turning on and off of the initialized backlight until all the images are scanned.

15. The apparatus according to claim 14, further comprising:
a pre-dividing unit configured to divide the backlight source and the liquid crystal panel in a display device into N horizontal row sections, respectively, wherein N represents a number greater than or equal to 3.

16. The apparatus according to claim 14, wherein the scanning control unit comprises:
a determining module configured to determine a format and sequential order in which the first and second left-eye and right-eye images are output; and
a scanning control module configured to scan each image sequentially in a top to bottom manner of the row sections in an order determined by the determining module according to the backlight source and the liquid crystal panel.

17. The apparatus according to claim 14, further comprising:
a first backlight control unit, in cooperation with a pair of shutter glasses, configured to control a left eyeglass of the pair of shutter glasses to be open and a right eyeglass of the pair of shutter glasses to be closed when the scanning image is the left-eye image; and
to control the right eyeglass to be open and the left eyeglass to be closed when the scanning image is the right-eye image.

18. The apparatus according to claim 14, further comprising:
a second backlight control unit, in cooperation with an active polarization light valve, configured to control the active polarization light valve to be open or closed alternately when the left-eye image and the right-eye image are scanned, respectively.

19. A 3D display system including a scanning control unit, a display device having a backlight, a backlight control unit, and 3D glasses for controlling a backlight source for a liquid crystal panel, row sections of the backlight source lighting row sections of the liquid crystal panel in a one-to-one corresponding relationship, the system comprising:
an obtaining unit configured to obtain preprocessed 3D images, each of the 3D images having a left-eye image and a right-eye image;
a preprocessing unit configured to divide the left-eye image into a first left-eye image including odd row sections and a second left-eye image including even row sections, and divide the right-eye image into a first right-eye image including odd row sections and a second right-eye image including even row sections, wherein the even row sections of the first left-eye image and the first right-eye image, and the odd row sections of the second left-eye image and the second right-eye image are black pictures;
or divide the left-eye image into a first left-eye image including even row sections and a second left-eye image including odd row sections, and divide the right-eye image into a first right-eye image including even row sections and a second right-eye image including odd row sections, wherein the odd row sections of the first left-eye image and the first right-eye image, and the even row sections of the second left-eye image and the second right-eye image are black pictures;
the scanning control unit configured to scan sequentially the first and second left-eye images and the first and second right-eye images; and
the backlight control unit configured, after a row section of one image is scanned, to control an initialized backlight of the row section to be turned on and then turned off when the same row section of a next image starts to be scanned, and to repeat the turning on and off of the initialized backlight until all the images are scanned.

* * * * *